United States Patent
Seel et al.

(10) Patent No.: US 10,624,032 B2
(45) Date of Patent: Apr. 14, 2020

(54) SYNCHRONIZING ASYNCHRONOUS DUAL-STACK RADIO EVENTS FOR HEARING DEVICE APPLICATIONS

(71) Applicant: IntriCon Corporation, Arden Hills, MN (US)

(72) Inventors: Mark Seel, Fridley, MN (US); Zachary Pope, Columbia Heights, MN (US)

(73) Assignee: IntriCon Corporation, Arden Hills, MN (US)

( * ) Notice: Subject to any disclaimer, the term of this patent is extended or adjusted under 35 U.S.C. 154(b) by 0 days.

(21) Appl. No.: 16/220,363

(22) Filed: Dec. 14, 2018

(65) Prior Publication Data

US 2019/0191378 A1    Jun. 20, 2019

Related U.S. Application Data

(60) Provisional application No. 62/607,224, filed on Dec. 18, 2017.

(51) Int. Cl.
| | |
|---|---|
| *H04W 52/02* | (2009.01) |
| *H04W 72/04* | (2009.01) |
| *H04R 25/00* | (2006.01) |
| *H04W 72/00* | (2009.01) |
| *H04W 8/00* | (2009.01) |
| *H04W 84/18* | (2009.01) |

(52) U.S. Cl.
CPC ........ *H04W 52/0232* (2013.01); *H04R 25/30* (2013.01); *H04R 25/554* (2013.01); *H04W 52/0241* (2013.01); *H04W 72/005* (2013.01); *H04W 72/0446* (2013.01); *H04W 8/005* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 7,519,193 | B2 | 4/2009 | Fretz |
| 8,355,517 | B1 | 1/2013 | Fretz |
| 8,358,797 | B2 | 1/2013 | Fretz |
| 8,767,987 | B2 | 7/2014 | Fretz |
| 8,849,202 | B2 | 9/2014 | Linde et al. |
| 9,716,969 | B2 * | 7/2017 | Song ...................... H04W 4/80 |
| 9,832,578 | B2 | 11/2017 | Pope |
| 2011/0021142 | A1 | 1/2011 | Desai et al. |
| 2012/0310395 | A1 | 12/2012 | El-Hoiydi |

(Continued)

*Primary Examiner* — Hong S Cho
(74) *Attorney, Agent, or Firm* — Shewchuk IP Services, LLC; Jeffrey D. Shewchuk (57) ABSTRACT

A battery-powered mobile hearing assist device allows concurrent wireless transception of control data via standard Bluetooth low energy ("BLE"), such as a smartphone, and proprietary audio streaming ("PAS") from a second device such as a wireless audio streaming accessory. Power savings are achieved particularly in situations where the hearing device is searching for the PAS device. Instead of performing PAS search events as a separate wireless activity from the BLE advertising or connection events, including waking and ramping up for each of the BLE and PAS protocols, PAS search events are combined into the BLE advertising or connection events before returning to the sleep mode in each connection interval, eliminating duplicative processor steps, ramp up and/or ramp down.

18 Claims, 7 Drawing Sheets

(56) References Cited

U.S. PATENT DOCUMENTS

| | | | |
|---|---|---|---|
| 2013/0102251 A1 | 4/2013 | Linde et al. | |
| 2014/0348327 A1 | 11/2014 | Linde et al. | |
| 2015/0010179 A1 | 1/2015 | Solum | |
| 2015/0201446 A1 | 7/2015 | Linsky et al. | |
| 2015/0312858 A1 | 10/2015 | Kerai | |
| 2015/0334488 A1 | 11/2015 | Kim et al. | |
| 2015/0341724 A1 | 11/2015 | Pedersen et al. | |
| 2015/0365208 A1 | 12/2015 | Hyun et al. | |
| 2015/0365999 A1 | 12/2015 | Lee et al. | |
| 2017/0251469 A1* | 8/2017 | Lee | H04L 1/16 |
| 2018/0006752 A1 | 1/2018 | Gehring et al. | |
| 2018/0191641 A1 | 7/2018 | Treue et al. | |
| 2019/0089490 A1* | 3/2019 | Linsky | H04L 1/1809 |
| 2019/0090287 A1* | 3/2019 | Redding | H04L 69/324 |

\* cited by examiner

SYNCHRONIZING ASYNCHRONOUS DUAL-STACK RADIO EVENTS FOR HEARING DEVICE APPLICATIONS

CROSS-REFERENCE TO RELATED APPLICATION(S)

The present application claims the benefit of U.S. provisional patent application Ser. No. 62/607,224, filed Dec. 18, 2017. The contents of U.S. provisional patent application Ser. No. 62/607,224 are hereby incorporated by reference in entirety.

BACKGROUND OF THE INVENTION

The present invention relates to body-worn mobile hearing devices, such as head-worn hearing aids and personal sound amplifier products ("PSAPs") which are powered by one or more batteries. In particular, the present invention pertains to such hearing devices which have the capacity to wirelessly stream real-time audio content, such as disclosed in U.S. Pat. No. 9,832,578, incorporated by reference.

Today's hearing devices are increasingly technologically advanced to improve the overall experience of the user, in some cases including integrated wireless systems. In one aspect, an on-board integrated wireless system can enable commands and programming data to be wirelessly communicated to the hearing device, such as via Bluetooth Low Energy ("BLE") for changing various settings or programs of the digital signal processor. Such hearing devices should be designed to use as little electrical power as possible and to conserve battery life for as long as possible, typically while using a battery which is quite small and lightweight.

When using BLE, all BLE radio activity, whether it is an advertisement or a connection event, happens in regular time intervals, that is, repeatable time frames. The BLE specification allows these regular time intervals to having a spacing which can be selected front 7.5 ms to 4 secs (with increments of 1.25 ms). The key to BLE's power savings is the duty cycle, or time comparison between the length of the connection event (the actual transmission Tx and/or reception Rx of wirelessly transmitted data, typically at higher current draws) and the connection interval. In some real world applications, such as sending settings of the digital signal processor of a hearing aid or PSAP, the connection event (Tx and/or Rx) is often a 300 µs maximum activity duration within a 500 ms connection interval, which corresponds to 0.06% duty cycle. During the majority of the 500 ms connection interval, there is little or negligible current draw for the radio components, commonly referred to as a "sleep" mode. When the microcontroller and radio components are "asleep", power is turned off (such as via one or more phase-locked loop ("PLL") type switches) to inactivate certain sections of the processor silicon, so no power is consumed therein until the wake-up trigger executes.

In terms of overall battery usage of the hearing aid, radio operation uses a significant percentage of battery power. Moreover, even though the advertising/connection event (Tx and/or Rx, which may be limited to lasting 300 µs or less) involves peak power consumption of the radio, significant power usage occurs at lower power levels immediately before and/or after (such as within 50 ms before or after) the actual advertising/connection event while not in sleep mode. For each wireless radio event, the processor is turned on, the radio front-end may be ramped up before the event and ramped down after the event, and various post-processing activities may be performed after the event. With battery drainage being critical to successful hearing device implementation, the radio usage and all associated processing should be undertaken to preserve as long of battery life as possible. Better solutions are needed.

BRIEF SUMMARY OF THE INVENTION

The present invention is a method of concurrent use of a radio transceiver in a device such as a hearing aid, and a hearing aid which uses the method. The hearing device allows control data to be transmitted to the radio transceiver from a first device (such as a smartphone) in a first wireless protocol (such as Bluetooth low energy) which involves a sleep mode, while concurrently allowing real time audio to be transmitted from a second device in a second wireless protocol (such as a proprietary audio streaming protocol transmitting at least 34 kbps of audio data), with the invention being primarily applicable to situations where the hearing device is searching for the second device. A connection interval is established for the first wireless protocol, and at least once per interval the processor and radio transceiver wakes up, ramps up and performs an advertising or connection event in the first protocol and thereafter returns to the sleep mode. A search event in the second wireless protocol is performed in remaining time of the connection interval. Instead of performing the search event as a separate wireless activity including waking and ramping up, the search event is combined into the advertising or connection event of the first protocol before returning to the sleep mode. By combining the events from the two separate protocols including a single waking up and ramping up per interval, power savings are achieved.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
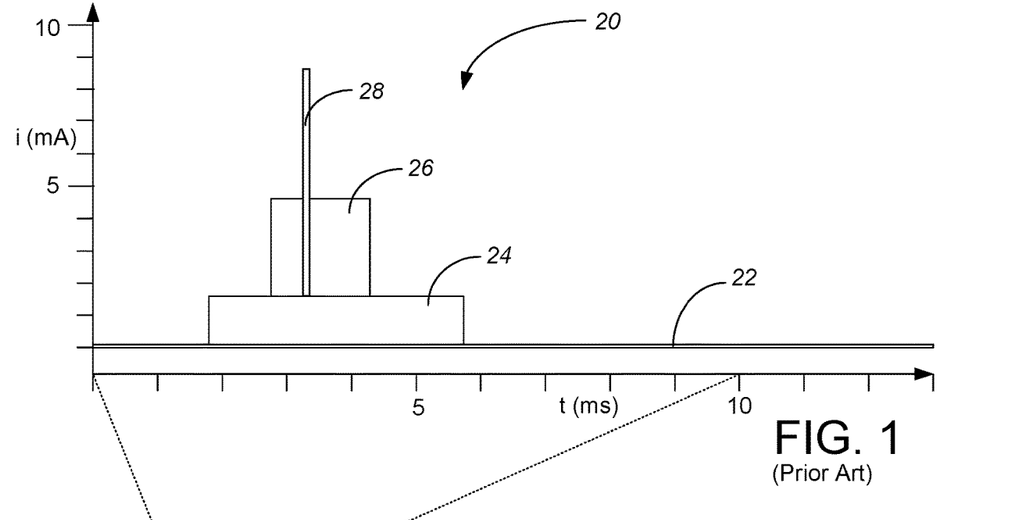
FIG. 1 shows a highly simplified model of electrical current usage as a function of time during a generic radio event.

FIG. 1 shows a simplified graph of current consumption versus time for a generic wireless radio event 20, generally applicable to a wide variety of wireless radios, including BLE frequency hopping wireless radios. FIG. 1 is also generally applicable to several different types of events, including advertising events and connection events. Typically the radio components will consume some minimal baseline level of current 22 during a sleep mode. This baseline sleep current 22 is extremely low. There is a processor which controls the radio components (often in conjunction with controlling numerous other functions of the hearing device). The additional current 24 consumed in the processor associated with radio control is typically an order of magnitude higher than the baseline sleep current 22. There is also current/power 26 consumed in the radio components before and/or after the actual Tx and/or Rx event. The actual Tx and/or Rx event occurs over a short interval at a relatively high current 28 (typically over 100× the baseline sleep current 22).

Merely for exemplary purposes to understand a typical generic wireless radio event 20, we can provide exemplary current and time values associated with the real world communications with the digital signal processor of a hearing aid or PSAP. Using a connection interval of 500 ms, a radio event 20 may have the entire wireless transmission (Tx) and/or reception (Rx) 28 occur within a 100 μs window at a peak current level of 4 mA. The processor control 24 of the radio may require current (say, 1.5 mA) which is only about one third of the peak current 28 to the radio components during the 100 μs Tx and/or Rx window, but may last for about forty times the duration (i.e., the processor may be running radio control operation for about 4 ms once during each 500 ms connection interval). The ramp up and ramp down of the radio components 26 may require current (say, 3 mA) which is about two-thirds of the peak current 28 to the radio components during the 100 μs Tx and/or Rx window, but may last for about fifteen times the duration (i.e., the ramp up and ramp down of radio components may last for about 1.5 ms once during each 500 ms connection interval). This example 20 would thus involve power consumption of Tx/Rx event 28 which is only about 0.4 μCoulomb/interval, with the ramp up and ramp down power consumption 26 being about 4.5 μCoulomb/interval and the additional processor consumption 24 being about 6 μCoulomb/interval. These numbers are intended to be merely exemplary, and will vary based on the specific radio components, the specific processor and the specific wireless transmission protocol and processing algorithms being used. However, workers skilled in the art will appreciate that the overall power consumption attributable to radio operation (such as 10.95 μCoulomb/interval in the example given above) should be minimized, and not merely the peak power consumption 28 (such as 0.4 μCoulomb/interval in the example given above) of the low duty cycle Tx/Rx event.

Figure 2:
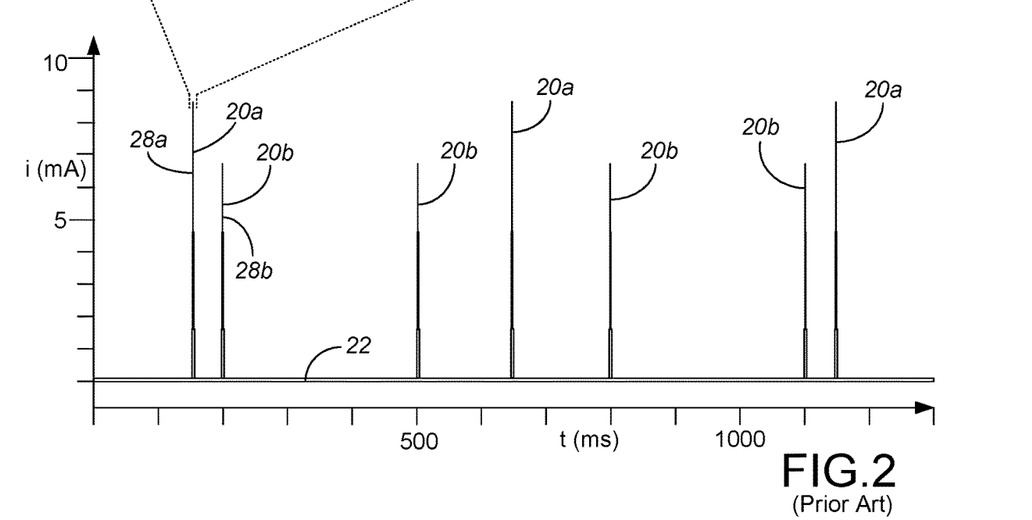
FIG. 2 is a simplified graph showing electrical current usage of a preferred implementation of several events using two different wireless protocols in a dual stack (at a time scale of $1/100^{th}$ of FIG. 1), such as in the BLE/PAS dual stack of the hearing aid of U.S. Pat. No. 9,832,578.

With that example of current usage during generic wireless radio events, consider a hearing device running both BLE and Proprietary Audio Streaming ("PAS") as taught in U.S. Pat. No. 9,832,578, schematically explained with reference to FIG. 2. The preferred devices of the present invention are battery powered hearing aids, which have a microphone, a digital signal processor receiving audio information from the microphone, and a receiver for outputting sound pressure waves to an ear canal of a user. In FIG. 2, a series of generic wireless radio events 20*a*, 20*b* are depicted at a ratio of ½₁₀₀$^{th}$ of the time scale shown in FIG. 1. In this example, BLE 20*a* is running using a connection interval of 500 ms, and PAS 20*b* is asynchronously running in a "search" mode using a connection interval of 300 ms. The duration of these connection intervals has a clear effect on delay and/or latency, e.g., with PAS 20*b* using a search connection interval of 300 ms, the delay to start PAS streaming, when the PAS accessory is turned on or brought into range, can clearly exceed 0.3 seconds at least in some instances. The power level of the BLE Tx/Rx 28*a* is higher than the power level of the PAS Tx/Rx 28*b*, but in overall power usage, both the BLE (advertising or connection) 20*a* and the PAS searching 20*b* consume significant power, reducing battery life.

Figure 3:
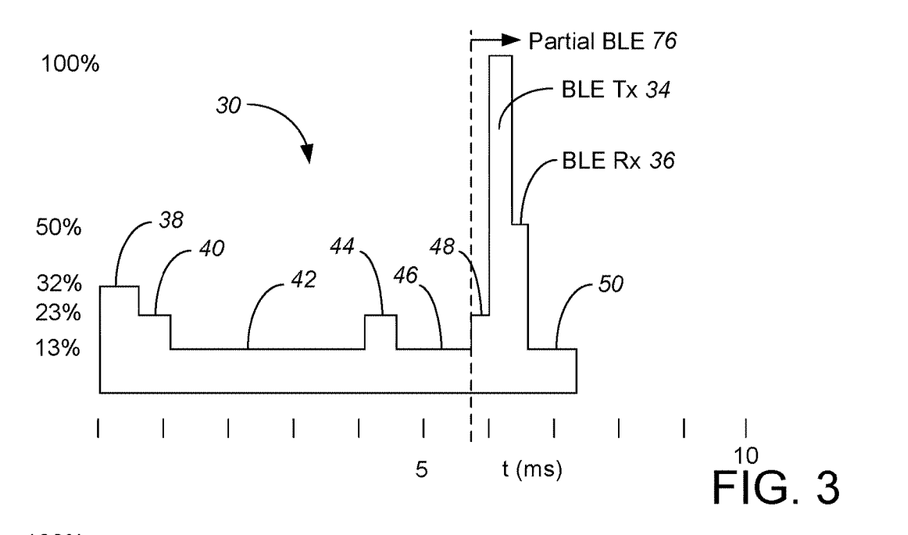
FIG. 3 shows a calculated/theoretical electrical current usage during a BLE advertising event as implemented in the most preferred hearing aid.
Figure 4:
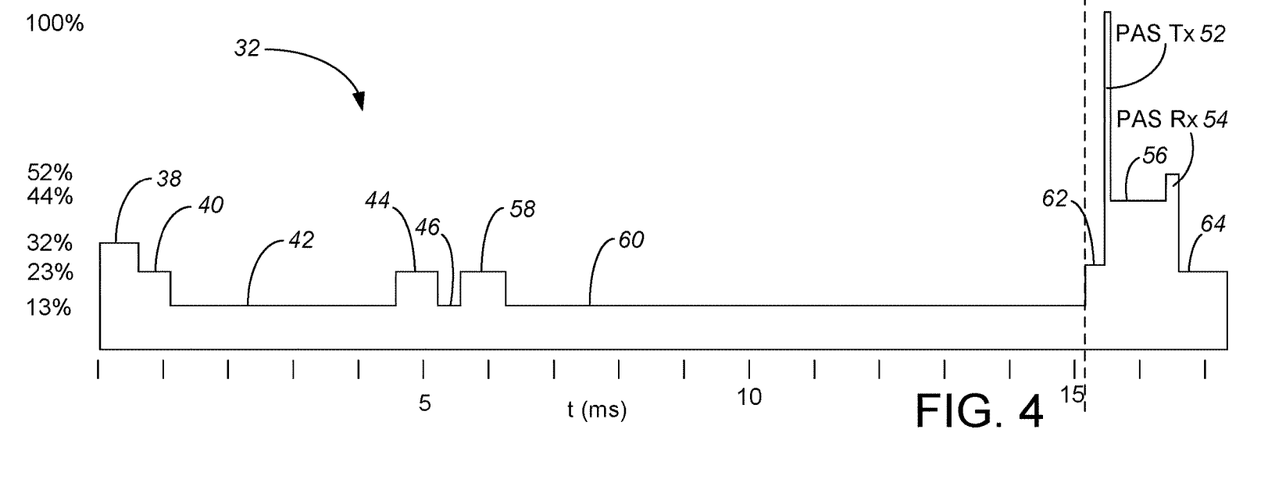
FIG. 4 shows a calculated/theoretical electrical current usage during a PAS search event as implemented in the most preferred hearing aid.

A more specific example of current usage is shown in FIGS. 3 and 4, for the most preferred hearing device of the present invention. The most preferred system arrangement involves both BLE and Proprietary Audio Streaming ("PAS") as taught in U.S. Pat. No. 9,832,578, and particularly using an NxH2003 2.4 GHz Bluetooth Low Energy (BLE) audio streaming System-on-chip from NxP Semiconductor, which embeds both an M0 microcontroller (running the protocol stack and the application) as well as a G.722 audio decoder to handle audio signal processing. FIG. 3 shows simplified/theoretical values for processor/ramp-up/ramp-down/Tx/Rx current usage for a BLE advertising event 30. In the most preferred device, the BLE is always being run in one of two states, either advertising or connected. When connected, the BLE is used to transmit control data (such as volume and band-specific gain) from a computing device such as a smartphone to the hearing device, at a maximum of 20 bytes per packet. The processor/ramp-up/ramp-down/Tx/Rx current usage for a BLE connection event would be quite similar, although the Tx and Rx may have a longer duration.

FIG. 4 shows similar simplified/theoretical values for processor/ramp-up/ramp-down/Tx/Rx current usage for a PAS search event 32. In the most preferred device, the PAS is always being run in one of three states, either off, searching or connected. If the user sets the PAS to "off", the PAS does not run and consumes no power/current (resulting in longer battery life, but not of interest to the present invention for reducing power consumption and increasing battery life). If the PAS is "on" and connected to stream real time audio (an audio signal of at least 34 kbps) to the hearing aid, those Tx/Rx events are considerably longer and more power intensive than depicted in FIG. 4. In particular, when the PAS is "on" and connected, the ratio of real time audio stream rate to control data transception rate is at least 50 to 1, and an audio track of an audio-visual program can be streamed with no greater than 40 ms latency. The present invention increases battery life most for those situations where the user has set the PAS to "on" 32, but the accessory is either NOT present, or is NOT streaming significant audio content.

In FIG. 3, the BLE advertising event 30 consumes appreciable current (beyond the sleep state) for a 7.4 ms duration. The actual Tx 34 uses a peak current over a 350 µs duration, which is a short portion out of the 7.4 ms duration that the advertising event 30 consumes current. The actual Rx 36 immediately follows the Tx 34, using a peak current of about 50% of the Tx peak current, over about a 250 µs duration. Thus, for each 7.4 ms BLE advertising event, there is additional power consumption (beyond sleep) for about 6.8 ms immediately before and after the Tx/Rx 34, 36 attributable to the processor and to the ramp up and ramp down. The pre-processing and ramp up additional power requirements, due to various tasks being performed in the processor and in ramping up the radio components, theoretically occurs in six different current usage segments: a) a first current usage segment 38, at about 32% of peak Tx current, lasting for 600 µs, which likely includes both ramping up of radio components and active microprocessor operations; b) a second current usage segment 40, at about 23% of peak Tx current, lasting for 500 µs, which likely includes active microprocessor operations; c) a third current usage segment 42, at about 13% of peak Tx current, lasting for 3 ms, which likely includes only minor microprocessor operations but is considerably higher than "sleep" power consumption; d) a fourth current usage segment 44, at about 23% of peak Tx current, lasting for 500 µs, which likely includes active microprocessor operations; e) a fifth current usage segment 46, at about 13% of peak Tx current, lasting for 1150 µs, which likely includes only minor microprocessor operations; and f) a sixth current usage segment 48, at about 23% of peak Tx current, lasting for 280 µs. The post-processing/ramp down additional power requirements 50 theoretically occurs at about 23% of peak Tx current, lasting for 750 µs, which likely includes active microprocessor operations. Finding the entire area of each of these nine theoretical, implementation specific components 34, 36, 38, 40, 42, 44, 46, 48, 50, the entire power for the BLE advertising event 30 can be thought of as 1.6 peak current*ms. Note that these values are specific for the processor being used, for the exact sequence of operations and timing of those operations within the processor, for the exact radio components and for the exact sequence and timing of ramp-up, i.e., all of the values and times given will vary in a different BLE implementation of the invention. Note further that these values are theoretical or calculated values, i.e., the actual current required at any given instant can vary slightly based on numerous real world considerations, including the age/deterioration of the processor and radio components, the discharge state of the battery, temperature, humidity, etc.

In FIG. 4, the PAS search event 32 consumes appreciable current (beyond the sleep state) for a 17.5 ms duration. The actual Tx 52 uses a peak current over a 90 µs duration. The actual Rx 54, using a peak current of about 52% of the Tx peak current, occurs over about a 200 µs duration, but is delayed by an interim 56 of about 860 µs which consumes about 44% of the Tx peak current. Thus, for each 17.5 ms PAS search event, there is additional power consumption (beyond sleep) for about 16.35 ms immediately before and after the Tx/Rx 52, 54 attributable to the processor and to the ramp up and ramp down. The pre-processing and ramp up additional power requirements, due to various tasks being performed in the processor and in ramping up the radio components, theoretically occurs in eight different current usage segments: a) a first current usage segment 38, at about 32% of peak Tx current, lasting for 600 µs; b) a second current usage segment 40, at about 23% of peak Tx current, lasting for 500 µs; c) a third current usage segment 42, at about 13% of peak Tx current, lasting for 3.5 ms; d) a fourth current usage segment 44, at about 23% of peak Tx current, lasting for 650 µs; e) a fifth current usage segment 46, at about 13% of peak Tx current, lasting for 350 µs; and f) a sixth current usage segment 58, at about 23% of peak Tx current, lasting for 700 µs; g) a seventh current usage segment 60, at about 13% of peak Tx current, lasting for 9 ms; and h) an eighth current usage segment 62, at about 25% of peak Tx current, lasting for 300 µs. The post-processing/ramp down additional power requirements 64 theoretically occurs at about 23% of peak Tx current, lasting for 750 µs. Finding the entire area of each of these twelve theoretical, implementation specific components 52, 54, 56, 38, 40, 42, 44, 46, 58, 60, 62, 64, the entire power for the PAS search event 32 can be thought of as 3.15 peak current*ms. Again, these values are very specific to the system components and set-up and are merely theoretical values for the PAS implementation.

Figure 5:
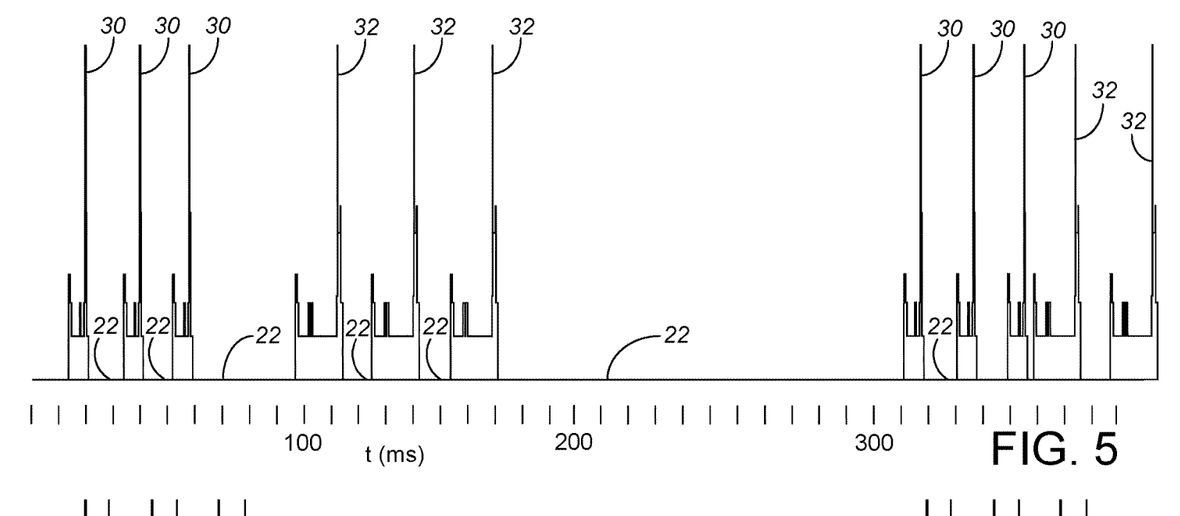
FIG. 5 shows use of the BLE advertising event of FIG. 3 with the PAS search event of FIG. 4 (at a time scale of about ½oth the time scale of FIGS. 3 and 4), in one preferred hearing aid implementation.

FIG. 5 now applies these theoretical, implementation-specific BLE and PAS current usage requirements 30, 32 to a preferred hearing aid. Rather than run a single BLE advertising event 30 per interval, the implementation runs three BLE advertising events 30 per interval (one on each of three different frequency channels for the frequency hopping algorithm), with sleep intervals 22 between each advertising event 30. Here the BLE interval is shown as 300 ms. Thus, the theoretical, implementation specific BLE advertising power can be thought of as 1.6×3=5.4 peak current*ms per BLE interval.

Rather than run a single PAS search event 32 per interval, the implementation runs three PAS search events 32 per interval (one on each of three different frequency channels for the frequency hopping algorithm), with sleep intervals 22 between each search event 32. Here the PAS interval is shown in FIG. 5 as 270 ms. The important thing to note, however, is neither the value of the 300 ms BLE interval nor the 270 ms PAS interval, but rather that the PAS interval can be independently selected from the BLE interval, with each interval running asynchronously. Using three PAS search events 32 per interval, the theoretical, implementation specific PAS search power can be thought of as 3.15×3=9.45 peak current*ms per PAS interval. When the embodiment shown in FIG. 5 was run in situ, it resulted in an actual average current draw of about 2.6 mA, greater than desirable for battery powered hearing aid implementations.

The present invention involves a change from running BLE events 30 and PAS search events 32 separately and asynchronously to running BLE events and PAS search events jointly and synchronously. Instead of performing a complete processor cycle and a complete ramp-up and ramp down for each BLE event 30 separately from a complete processor cycle and a complete ramp-up and ramp down for each PAS search event 32, whenever the hearing device is in the PAS search mode, the BLE events and PAS search events are joined and synchronized.

Figure 6:
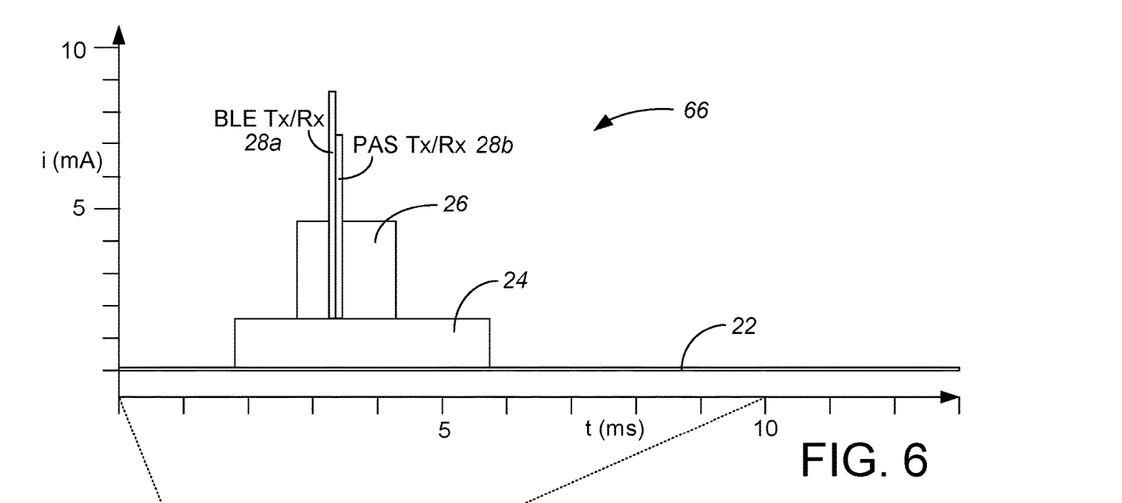
FIG. 6 is a highly simplified model of electrical current usage as a function of time using the present invention to combine and synchronize two radio events of different protocols.
Figure 7:
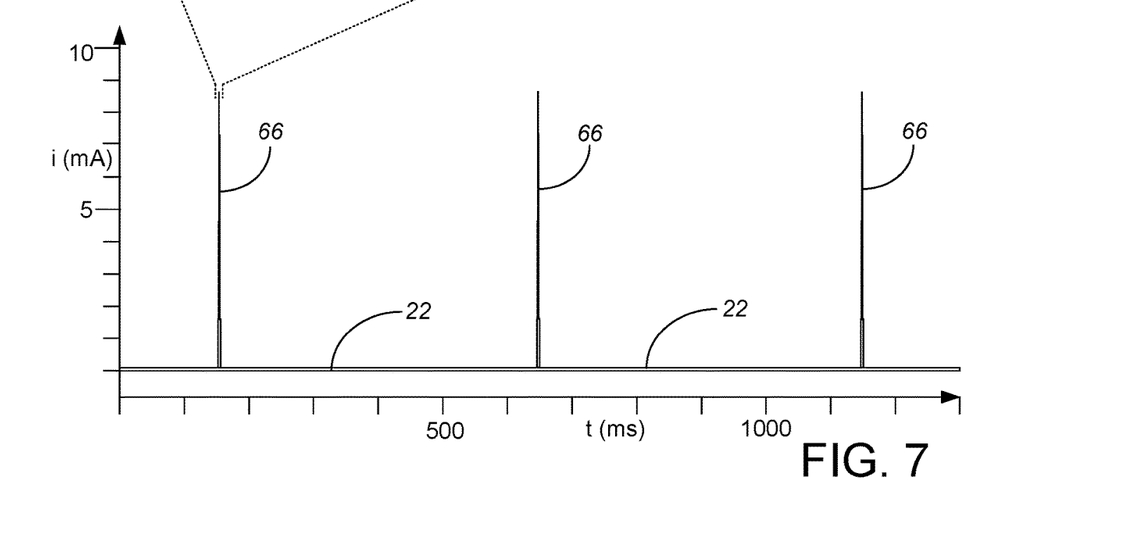
FIG. 7 shows a longer duration of the invention shown in FIG. 6 (at a time scale of $1/100^{th}$ of FIG. 6).

Turning back to considering the generic wireless radio event of FIGS. 1 and 2, the present invention is applied to sets of two synchronized generic wireless radio events 28a, 28b as shown in FIGS. 6 and 7. Any duplication of processor actions 24, and of ramp-up and ramp-down 26, between the two different radio protocols is eliminated to the extent possible. FIG. 6 shows the concept of the present invention as applied to a single set 66 of wireless radio events using the dual stack. FIG. 7 shows the concept of the present invention as applied to three sets of wireless radio events 66 using the dual stack. The actual power usage of the Tx and Rx 28a, 28b, by each different protocol (such as by BLE and by PAS) is unchanged. Moreover, the synchronization results in loss of the freedom to run each wireless protocol event 20a, 20b with its own interval timing. However, synchronizing the events 66, where possible, reduces the power overhead of the overall system, primarily by combining the wake-up energy for both stacks. The sleep interval 22 between adjacent, different protocol events is eliminated, i.e., the sleep state 22 is only achieved once per interval.

Considering only one event 28a, 28b for each protocol per interval, the power savings for this invention can approach 50%. (When power savings is discussed herein, it is the power savings associated with the wireless functions, not the power savings for the entire hearing aid, which simultaneously performs other functions—such as digital signal processing for the hearing impairment of the particular user, and outputting sound—that use power.) For example in comparison to the 10.95 μCoulomb/interval FOR EACH PROTOCOL discussed above, combining two equally powered Tx/Rx events (0.4 μCoulomb each) with a single 10.55 μCoulomb/interval processor usage/ramp-up/ramp-down to result in a usage of 11.35 μCoulomb/interval, i.e., a savings of 21.9−11.35/21.9=48% power savings. If one or both protocols having multiple events per interval which can be further combined between sleep times, the power savings can exceed 50%.

Figure 8:
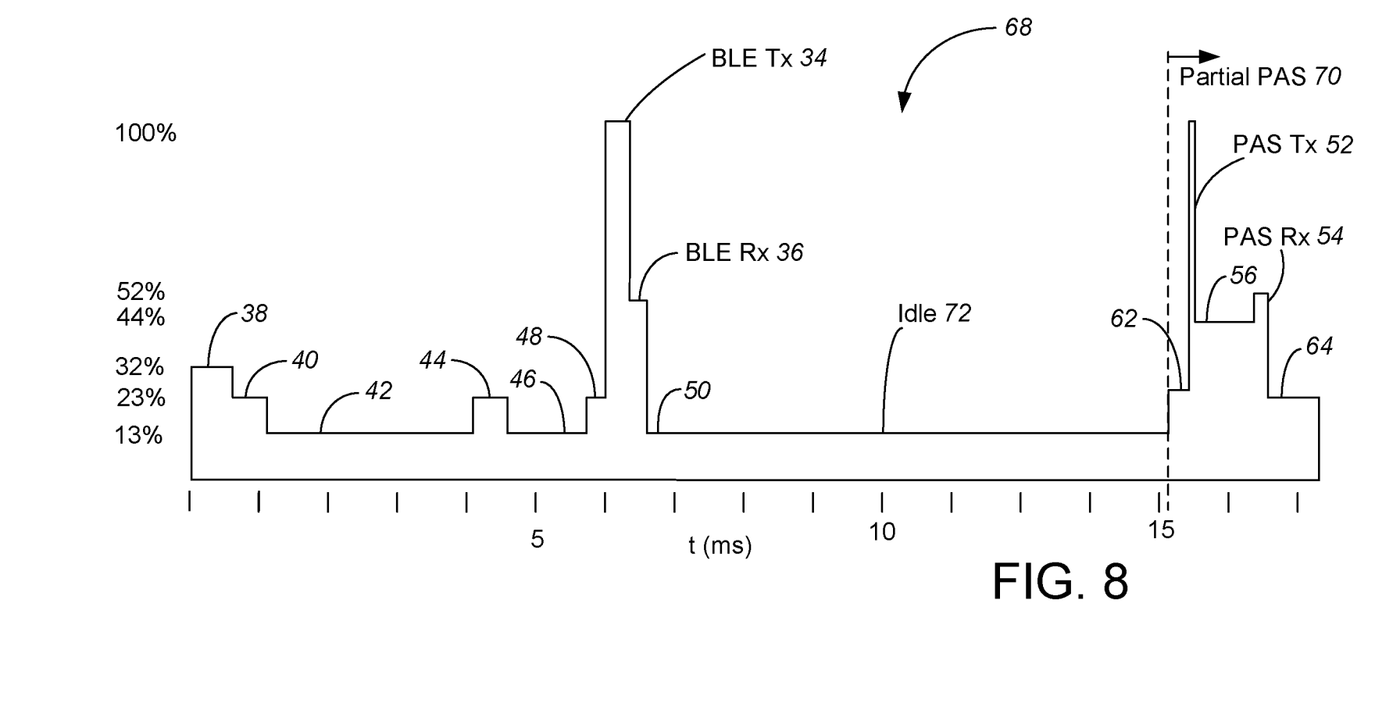
FIG. 8 shows a calculated/theoretical electrical current usage during a synchronized and combined BLE advertising/PAS search event as implemented in the most preferred hearing aid.

Turning back to considering the more specific BLE advertising 30 and PAS search 32 wireless radio events of FIGS. 3-5, FIGS. 8-13 show in more detail the most preferred, implemented version of the present invention. FIG. 8 depicts a combination 68 of the BLE event 30 of FIG. 3 and the PAS event 32 of FIG. 4 into a single set 68 of radio events. When comparing FIGS. 3 and 4, there is a significant overlap of the pre-processing and ramp-up power usage between the BLE and the PAS events 30, 32. To combine the BLE and PAS events 30, 32, the strategy is to exclude as much of the processor, ramp-up and ramp-down functions from the PAS event 32 as overlaps with the BLE event 30 (and can be easily excluded when implemented). The final five segments 62, 52, 56, 54, 64 of the PAS event 32, considered a "partial PAS" event 70, do not overlap with any portion of the BLE event activity 30, and accordingly cannot be excluded. Using the values given above, the "partial PAS" event 70 has a duration of 2.2 ms and a power usage of 0.82 peak current*ms.

After performing all the actions 34, 36, 38, 40, 42, 44, 46, 48, 50 of the BLE event 30, instead of returning to the sleep state, the present invention maintains an "idle" state 72 for an additional 6.9 ms at 13% of peak Tx power, for an idle power usage of 0.9 peak current*ms. During this "idle" state 72, remaining (non-overlapping) processor activities necessary for the PAS event are performed, before appending the "partial PAS" event 70 to the BLE event 30. The result is a combined, synchronized BLE/PAS event 68, which lasts a total of 16.5 ms. In contrast to the 1.6+3.15=4.75 peak current*ms power required to perform the events 30, 32 of both FIGS. 3 and 4, the entire theoretical power for the combined, synchronized BLE/PAS event 68 of FIG. 8 can be thought of as 1.6 (BLE)+0.9 (idle)+0.82 (partial PAS)=3.32 peak current*ms, i.e., a power savings in this example implementation of (4.75−3.32)/4.75=30%.

Figure 9:
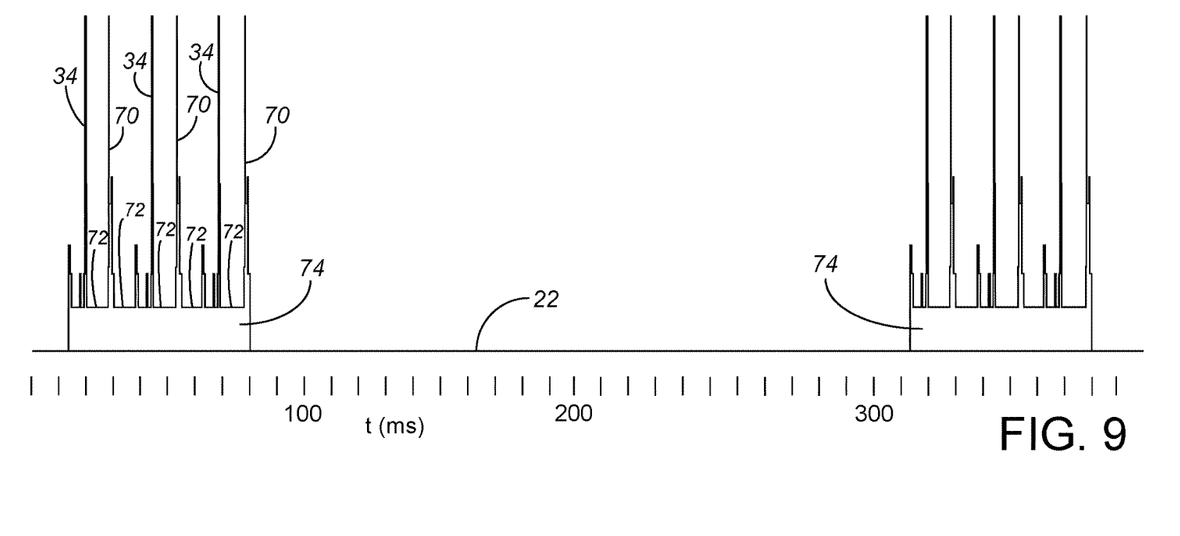
FIG. 9 shows use of the synchronized and combined BLE advertising/PAS search event of FIG. 8 (at a time scale of about ½oth the time scale of FIG. 8), in the most preferred hearing aid implementation.

FIG. 9 shows the implementation to replace the three BLE advertising events 30 and the three PAS search events 32 of FIG. 5. Instead of the one combined, synchronized BLE/PAS event 68 shown in FIG. 8, three synchronized BLE/PAS events are combined 74 without ever allowing the components to return to the sleep state 22. Additional 6.9 ms at 13% of peak Tx power idles 72 are added after the first two partial PAS events 70 prior to restarting the combined, synchronized BLE/PAS event. In contrast to the roughly 5.4+9.45=14.45 peak current*ms per interval of FIG. 5, the present invention as shown in FIG. 9 results in 3(1.6) (BLEs)+3(0.82)(partial PASs)+5(0.9)(idles)=11.76 peak current*ms per interval. In other words, the calculated power reduction, from the first "as implemented" version of the present invention, was 14.45−11.76/14.45=18.6%. Further battery power savings are achievable with the present invention by optimizing the implementation so the "idle" time periods 72 within the single combined, synchronized BLE/PAS events 74 are shortened to less than 6.9 ms each. For instance, when performing three BLE advertisement events 34 interleaved with three PAS search events 70, it is possible to have the first "idle" 72 at 6.9 ms, but have the second through fifth idles 72 be much shorter. Still further power savings are achieveable with the present invention by reducing the second and third BLE advertisement events to only include a partial BLE 76 (identified in FIG. 3, not implemented in FIG. 9 but implemented in FIGS. 10 and 11).

Figure 10:
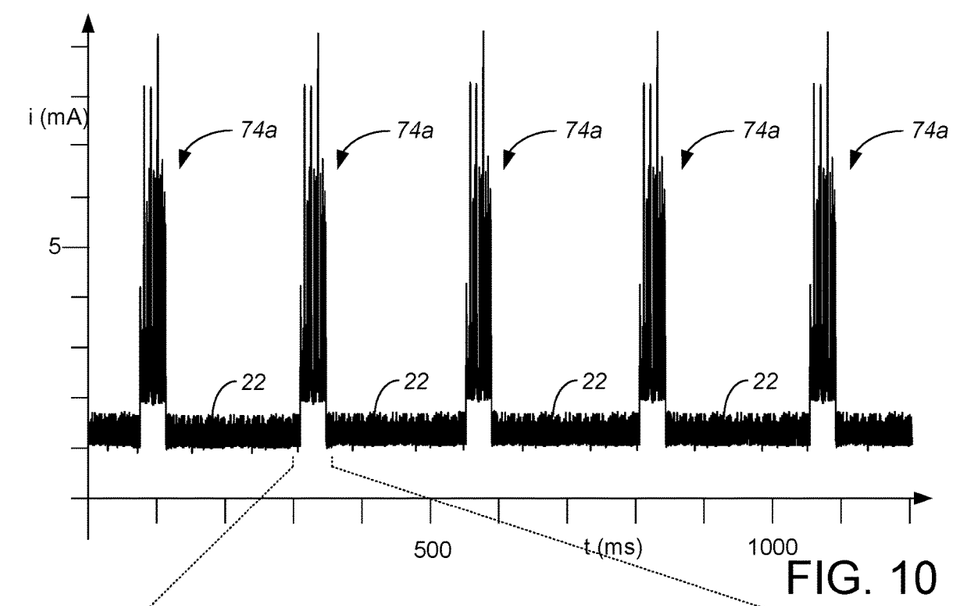
FIG. 10 shows test results of electrical current usage as implemented in the most preferred hearing aid implementation, during BLE advertising/PAS search.
Figure 11:
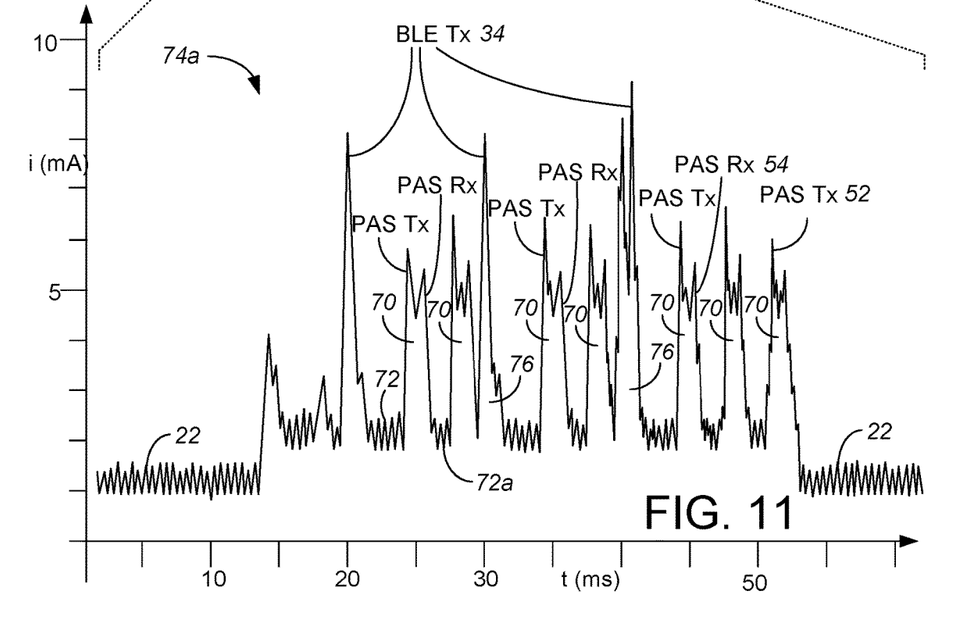
FIG. 11 shows test results of electrical current usage of a single synchronized and combined BLE advertising/PAS search event (at a time scale of ½oth the time scale of FIG. 10).

FIGS. 10-13 show a tested example of actual power consumption of using the present invention in the most preferred hearing aid. The hearing aid was a Lumen 155 hearing aid from IntriCon Corporation (assignee of the present invention), powered with a ZincAir 312 battery. Current usage was measured using a CMicroTek Current Meter, normalized using a Fluke digital multimeter, and plotted using a RIGOL DS1104 ULTRAVISION oscilloscope. FIG. 10 shows results over 1.2 s of a test duration, performing BLE advertising with PAS search, which involved five 250 ms intervals. FIG. 11 shows a single combined, synchronized BLE/PAS event 74a, with the time scale increased 20× relative to the time scale of FIG. 10. The BLE Tx peak power 34 was set slightly higher than the PAS Tx peak power 52. In the single combined, synchronized BLE/PAS event 74a, three BLE Tx events 34 can be clearly identified, and seven sets 70 of PAS Tx events 52 and PAS Rx events 54 can also be identified. In comparison to the synchronized BLE/PAS events 74 shown in FIG. 9 which used five 6.9 ms idles 72, the implementation of FIGS. 10-13 was able to shorten up the second and subsequent idles 72a to closer to 1 ms, including running only partial BLEs 76 when following a partial PAS search event 70. The reason that the synchronized BLE/PAS event 74a includes seven partial PAS search events 70 rather than the three per interval shown in FIG. 9 was due to the deprioritized scheduling of the partial PAS search events 70 relative to the partial BLE advertising events 76. Even when performing seven partial PAS events 70, the present invention resulted in a reduction in current draw of about 20% relative to the average of 2.6 mA which was consumed on the identical system but not using the present invention.

Figure 12:
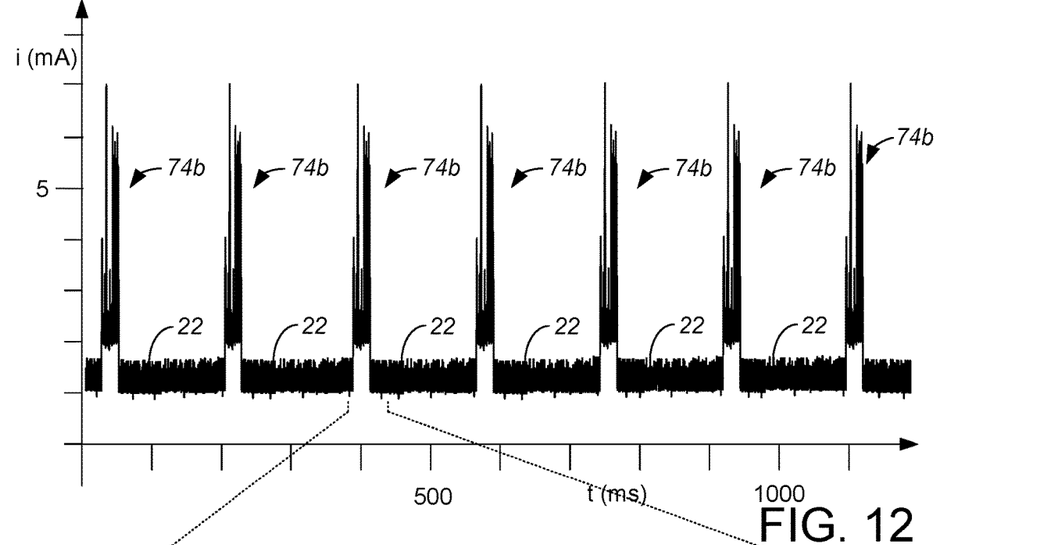
FIG. 12 shows test results of electrical current usage as implemented in the most preferred hearing aid implementation, during BLE connection/PAS search.
Figure 13:
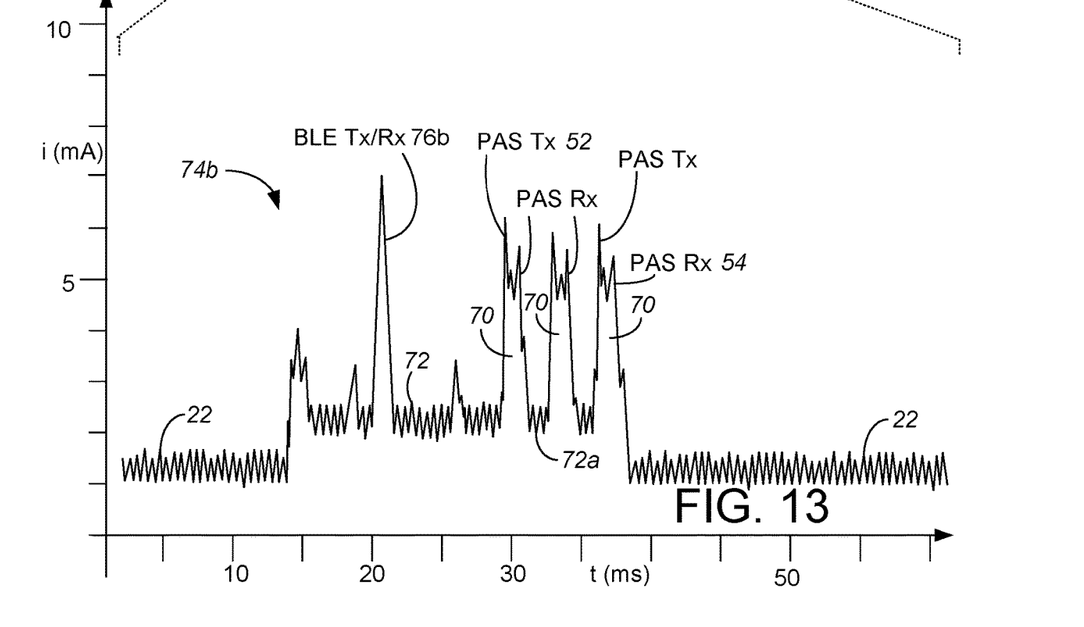
FIG. 13 shows test results of electrical current usage of a single synchronized and combined BLE connection/PAS search event (at a time scale of ½oth the time scale of FIG. 12).

In contrast to the BLE advertisement/PAS search state of FIGS. 8-11, when BLE is in a connected state, only a single BLE event 30 is combined with three partial PAS search events 70. At the same time, the preferred system reduces the duration of connection intervals when in a BLE connection/PAS search state as compared to a BLE advertisement/PAS search state. FIGS. 12 and 13 shows test results of the present invention as implement using the identical test set-up as for FIGS. 9 and 10, but in a BLE connection/PAS search state. Like FIG. 10 did, FIG. 12 shows actual current draw over a 1.2 s test duration. The connection interval was reduced, such that FIG. 13 shows seven 180 ms intervals. The shorter connection interval results in a shorter delay for starting of a PAS stream.

FIG. 13 shows a single combined, synchronized BLE/PAS event 74*b* for the BLE connection/PAS search, with the time scale increased 20× relative to the time scale of FIG. 12. In the single combined, synchronized BLE connected/PAS search event 74*b*, with the BLE connection established, a single BLE Tx/Rx event 76*b* can be clearly identified. With the PAS performing its search routine, three partial PAS events 70 (each with a PAS Tx 52 and a PAS Rx 54) can also be identified.

The present invention thus results in significant battery power savings as combined to the asynchronous dual BLE/PAS stack. Additional power savings may also be achieveable with the present invention by having the idle power reduced to less than 13% of peak Tx power. While the present application discusses the benefits specific to a dual stack running BLE and PAS, the concepts can be applied to a dual stack simultaneously running any two wireless protocols. In all instances, the optimization scheme is to minimize duplication of activity in the processor and for ramp-up and ramp-down of radio components by combining and synchronizing the dual stack protocols.

Although the present invention has been described with reference to preferred embodiments, workers skilled in the art will recognize that changes may be made in form and detail without departing from the spirit and scope of the invention.

What is claimed is:

1. A battery-powered, body-worn hearing aid capable of communicating with a first external device via Bluetooth low energy and concurrently communicating with a second external device via proprietary audio streaming, comprising:
    a processor which establishes connection intervals in a series, the processor having a radio transception sleep mode; and
    a radio transceiver controlled by the processor to:
        for each connection interval in the series of connection intervals, send and/or receive data in accordance with Bluetooth low energy protocol, thereby completing a first protocol transception event, the first protocol transception event being either a connection event or an advertising event in Bluetooth low energy protocol; and
        for each connection interval in the series of connection intervals, thereafter send and/or receive data in accordance with proprietary audio streaming protocol, thereby completing a second protocol transception event;
    without having the processor return to the sleep mode after the first protocol transception event and before the second protocol transception event during that connection interval, and with having the processor return to sleep mode after the second protocol transception event during each connection interval.

2. The hearing aid of claim 1, wherein Bluetooth low energy connection events allow transception of control data for the hearing aid.

3. The hearing aid of claim 2, wherein the second protocol transception event comprises a search transmission in a search mode looking for a signal from the second external device.

4. The hearing aid of claim 3, wherein the processor schedules an idle period between the first protocol transception event and the second protocol transception event within each connection interval, with the processor remaining wakened during the idle period.

5. The hearing aid of claim 4, wherein peak current of the first protocol transception event is higher than peak current of the second protocol transception event.

6. A method of concurrent use of a radio transceiver in a device capable of communicating with a first external device in a first protocol and concurrently communicating with a second external device in a second protocol, the first protocol using a connection interval with a first timing of 4 seconds or less; comprising:
    for each connection interval in a series of connection intervals, waking a processor controlling the radio transceiver from a sleep mode, and ramping up components of the radio transceiver;
    for each connection interval in the series of connection intervals, using the radio transceiver to send and/or receive data in accordance with the first protocol, thereby completing a first protocol transception event, the first protocol transception event being either a connection event or an advertising event in the first protocol;
    for each connection interval in the series of connection intervals, thereafter using the radio transceiver to send and/or receive data in accordance with the second protocol, thereby completing a second protocol transception event, without returning to the sleep mode after the first protocol transception event and before the second protocol transception event during that connection interval;
    for each connection interval in the series of connection intervals, following the second protocol transception event, ramping down the components of the radio transceiver and returning the processor controlling the radio transceiver to the sleep mode.

7. The method of concurrent use of a radio transceiver of claim 6, wherein the second external device can provide real time audio streaming of at least 34 kbps in a connected mode, and wherein the second protocol transception event comprises a search transmission in a search mode looking for a signal from the second external device.

8. The method of concurrent use of a radio transceiver of claim 7, wherein the device is a battery powered, body-worn, hearing assist device capable of amplifying ambient sound into the ear of the wearer.

9. The method of concurrent use of a radio transceiver of claim 8, wherein the first protocol is Bluetooth low energy, wherein connection events allow transception of control data for the hearing assist device.

10. The method of concurrent use of a radio transceiver of claim 9, wherein the first protocol transception event is a Bluetooth low energy connection event.

11. The method of concurrent use of a radio transceiver of claim 9, wherein the first protocol transception event is a Bluetooth low energy advertising event.

12. The method of concurrent use of a radio transceiver of claim 11, comprising three Bluetooth low energy advertising events in each connection interval.

13. The method of concurrent use of a radio transceiver of claim 12, wherein the three Bluetooth low energy advertising events in each connection interval are at different frequencies.

14. The method of concurrent use of a radio transceiver of claim 9, wherein Bluetooth low energy events take scheduling priority over the second protocol transception events.

15. The method of concurrent use of a radio transceiver of claim 9, comprising an idle period between the first protocol transception event and the second protocol transception event, with the processor remaining wakened during the idle period.

16. The method of concurrent use of a radio transceiver of claim 7, comprising three search transmissions in each connection interval.

17. The method of concurrent use of a radio transceiver of claim 16, wherein the three search transmissions in each connection interval are at different frequencies.

18. A battery-powered, body-worn hearing assist device capable of communicating with a first external device in a first protocol and concurrently communicating with a second external device in a second protocol, the first protocol using a connection interval with a first timing of 4 seconds or less; comprising:
    means for establishing connection intervals in a series, having a radio transception sleep mode; and
    means for, for each connection interval in the series of connection intervals, waking and ramping up, followed by sending and/or receiving data in accordance with the first protocol, thereby completing a first protocol transception event, the first protocol transception event being either a connection event or an advertising event in the first protocol, followed by sending and/or receiving data in accordance with the second protocol, thereby completing a second protocol transception event, without returning to the sleep mode after the first protocol transception event and before the second protocol transception event during that connection interval, followed by returning to the sleep mode.

* * * * *